United States Patent [19]

Flick

[11] Patent Number: 6,140,938
[45] Date of Patent: *Oct. 31, 2000

[54] REMOTE CONTROL SYSTEM SUITABLE FOR A VEHICLE AND HAVING REMOTE TRANSMITTER VERIFICATION

[76] Inventor: Kenneth E. Flick, 5236 Presley Pl., Douglasville, Ga. 30135

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/622,515

[22] Filed: Mar. 25, 1996

Related U.S. Application Data

[63] Continuation-in-part of application No. 08/423,570, Apr. 14, 1995, Pat. No. 5,654,688.

[51] Int. Cl.[7] .................................................. G08C 19/00
[52] U.S. Cl. .................... 340/825.69; 340/426; 340/539; 340/825.37; 307/10.1
[58] Field of Search ..................................... 340/426, 539, 340/895.3, 895.32, 875.36, 875.37, 875.69, 875.72; 307/10.1–10.6; 341/174, 175, 176

[56] References Cited

U.S. PATENT DOCUMENTS

| | | | |
|---|---|---|---|
| 4,205,300 | 5/1980 | Ho et al. | 340/65 |
| 4,327,444 | 4/1982 | Court | 455/100 |
| 4,383,242 | 5/1983 | Sassover et al. | 340/64 |
| 4,414,541 | 11/1983 | Ho | 340/566 |
| 4,450,437 | 5/1984 | Ho | 340/540 |
| 4,628,400 | 12/1986 | Ho | 361/172 |
| 4,674,454 | 6/1987 | Phairr | 123/179 B |
| 4,754,255 | 6/1988 | Sanders et al. | 340/64 |
| 4,812,814 | 3/1989 | Elliott | 340/332 |
| 4,893,240 | 1/1990 | Karkouti | 364/424.05 |
| 5,024,186 | 6/1991 | Long et al. | 123/179 B |
| 5,040,990 | 8/1991 | Suman et al. | 439/34 |
| 5,049,867 | 9/1991 | Stouffer | 340/426 |
| 5,103,221 | 4/1992 | Memmola | 340/825.31 |
| 5,129,376 | 7/1992 | Parmley | 123/179.2 |
| 5,132,660 | 7/1992 | Chen et al. | 340/428 |

(List continued on next page.)

FOREIGN PATENT DOCUMENTS

| | | |
|---|---|---|
| WO 92/02702 | 2/1992 | European Pat. Off. ........ E05B 49/00 |
| 0 535 555 A1 | 9/1992 | European Pat. Off. . |
| 43 25 221 | 7/1993 | Germany . |
| WO 91/15645 | 10/1991 | WIPO . |

OTHER PUBLICATIONS

Lexus, 1995 Repair Manual SC400 SC300, vol. 3, (first printing 1/10/94) pp. BE–479 –BE–522.
8–in–1 Universal Remote Control, 1990.

*Primary Examiner*—Michael Horabik
*Assistant Examiner*—Anthony A. Asongwed
*Attorney, Agent, or Firm*—Allen, Dyer, Doppelt, Milbrath & Gilchrist, P.A.

[57] ABSTRACT

A remote control system for a vehicle includes a controller for learning a unique code of a remote transmitter to define a learned remote transmitter capable of causing performance of a function associated with the vehicle, for example. The controller performs remote transmitter verification to generate an indication relating to whether a new uniquely coded remote transmitter has been learned by the controller. The remote control system is advantageously used, in one embodiment, for a vehicle security system. Transmitter verification may also be incorporated in a remote keyless entry system, remote engine starting system, and a door access system, for example. In one embodiment, the remote transmitter verification is based upon the controller being recently entered into the remote transmitter learning mode. According to another embodiment, the remote transmitter verification is based upon a number of learned remote transmitters, a change in that number, or a change in a learned code of a remote transmitter. The indication may be provided at the vehicle or remote therefrom by any of a light, a visual display, a vibration transducer, a speech message generator, and an audible signal generator, for example.

62 Claims, 6 Drawing Sheets

U.S. PATENT DOCUMENTS

| | | | |
|---|---|---|---|
| 5,146,215 | 9/1992 | Drori | 340/825.32 |
| 5,159,334 | 10/1992 | Baumert et al. | 340/825.72 |
| 5,278,547 | 1/1994 | Suman et al. | 340/825.32 |
| 5,285,186 | 2/1994 | Chen | 340/428 |
| 5,309,144 | 5/1994 | Lacombe et al. | 340/539 |
| 5,323,140 | 6/1994 | Boyles | 340/428 |
| 5,349,931 | 9/1994 | Gottlied et al. | 123/179.2 |
| 5,365,225 | 11/1994 | Bachhuber | 340/825.31 |
| 5,654,688 | 8/1997 | Allen et al. | 340/426 |

REMOTE CONTROL SYSTEM SUITABLE FOR A VEHICLE AND HAVING REMOTE TRANSMITTER VERIFICATION

RELATED APPLICATION

The present application is a continuation-in-part application of U.S. patent application, Ser. No. 08/423,570; filed Apr. 14, 1995, now U.S. Pat. No. 5,654,688.

FIELD OF THE INVENTION

The present invention relates to the field of remote control systems, and more particularly, to a remote control system, such as for vehicle security.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the vehicle security system or provide other remote control features from a predetermined range away from the vehicle.

As disclosed in U.S. Pat. No. 5,049,867 to Stouffer and U.S. Pat. No. 5,146,215 to Drori, the security system controller may include features to store and compare unique codes associated with a plurality of remote transmitters, each remote transmitter having its own unique code initially programmed therein. U.S. Pat. No. 5,146,215 in particular discloses that remote transmitter codes may be added or deleted from the controller corresponding to the number of remote transmitters desired by the user. Unfortunately, a would-be thief gaining access to the controller may readily enter the program or learn mode and install the code of an unauthorized remote transmitter. The owner would thus be unaware of such activity, until the thief returns with the unauthorized remote transmitter to disarm the security system and steal the vehicle, or steal the vehicle contents.

Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter. The system provides a thirty second time window in which to operate one or more uniquely coded remote transmitters to load the transmitter codes into memory. If someone desired to surreptitiously record a new transmitter code into someone else's receiver, the new code would overwrite the prior codes so that only the new code would remain. If the authorized transmitter ceased to operate, the user may recognize that the receiver had been the subject of tampering. Unfortunately, the user may also simply assume that the battery in his remote transmitter had failed and would be unaware that a new transmitter had been coded into the system without his knowledge.

Remote vehicle starting systems also typically include uniquely coded remote transmitters capable of remotely starting the vehicle engine, and wherein the transmitter codes may be learned into the system. Other remote control systems for a vehicle operate similarly, and are subject to tampering or bypassing by one gaining access to the controller to record a different unauthorized transmitter code. Unfortunately, the user may be completely unaware that a new transmitter has been coded and may operate the remote control system, until, for example, a thief returns with a coded remote transmitter, disarms the security system and steals the vehicle.

SUMMARY OF THE INVENTION

In view of the foregoing background, it is therefore an object of the invention to provide a vehicle security system and related method for reducing the risk of an unauthorized remote transmitter being able to disarm the vehicle security system.

It is another object of the present invention to provide a similar enhanced security feature to the remote control of other functions associated with a vehicle, such as keyless door entry, and remote engine starting, for example.

These and other objects, features and advantages in accordance with the invention are provided by a remote control system for a vehicle for permitting a user to remotely control a function associated with the vehicle and comprising remote transmitter learning means for learning a unique code of a remote transmitter to define a learned remote transmitter capable of causing performance of a function associated with the vehicle; and remote transmitter verifying means for generating an indication relating to whether a new uniquely coded remote transmitter has been learned by the remote transmitter learning means. The system also preferable includes at least one uniquely coded remote transmitter, and a receiver for receiving a signal from the remote transmitters.

The remote control system is advantageously used, in one embodiment, for a vehicle security system. In particular, the security system further preferably includes at least one vehicle security sensor, and an alarm controller switchable between an armed mode and a disarmed mode responsive to a learned remote transmitter. The alarm controller in the disarmed mode is capable of generating an alarm responsive to a vehicle security sensor. If a remote transmitter were learned without authorization, the would-be criminal could return to the vehicle, disarm the security system and steal the vehicle. The present invention provides the user with a verification that only authorized remote transmitters can disarm the security system, and conversely that no unauthorized remote transmitters have been learned.

The remote control system can also be used for a remote keyless door entry system including a plurality of vehicle door locks movable between locked and unlocked positions, and a door lock controller for moving the vehicle door locks between locked and unlocked positions responsive to a learned remote transmitter. If the user is made aware of the possibility that an unauthorized remote transmitter has been learned into the remote keyless entry system, the user can take steps to delete the learned remote transmitters and relearn only authorized remote transmitters.

Similarly, the remote control system may also be used for a remote engine starting system. In particular, such an embodiment preferably includes a vehicle engine starter, and a remote start controller for operating the vehicle engine starter responsive to a learned remote transmitter. Again the user would be alerted by the remote transmitter verifying means to the possibility of an unauthorized remote transmitter being capable of remote starting the vehicle.

The remote transmitter learning means is preferably switchable between a learning mode permitting learning of a unique code of a remote transmitter, and a secure mode. The remote transmitter learning means also preferably includes remote transmitter deleting means for deleting all prior learned remote transmitters based upon entering the learning mode. If all the remote transmitters are deleted, the user can be assured that only authorized transmitters have been coded or learned thereafter.

In one embodiment, the remote transmitter verifying means comprises learning mode entered indicating means for indicating that the learning mode of the remote transmitter learning means has been entered. More particularly, the learning mode entered indicating means preferably comprises time lapse means for indicating when the learning mode of the remote transmitter learning means has last been entered. This indication can be provided by progressively indicating a passage of time or the elapsed time since the learning mode has last been entered.

According to another approach or embodiment of the invention, the remote transmitter verifying means preferably comprises learned remote transmitter number indicating means for indicating a number of learned remote transmitters. Alternately, the remote transmitter verifying means may comprise learned remote transmitter change indicating means for indicating a change in a number of learned remote transmitters. In yet another embodiment, the remote transmitter verifying means preferably comprises learned remote transmitter code change indicating means for indicating a change in a unique code of learned remote transmitters. In each variation, the user is alerted to the possibility of an unauthorized transmitter having been learned.

The verifying means preferably comprises indicating means for generating an indication relating to whether a new uniquely coded remote transmitter has been learned by the remote transmitter learning means. The indicating means may be vehicle indicating means associated with the vehicle, or remote indicating means remotely positioned from the vehicle. The indicating means may be provided by at least one of a light, a visual display, a vibration transducer, a speech message generator, and an audible signal generator.

Yet another aspect of the present invention is that the verifying means may include activating means for causing the indicating means to generate an indication responsive to a manually operated switch at the vehicle or remote therefrom, or a vehicle sensor, such as associated with the vehicle doors or ignition switch, for example. The activating means may also be provided by a remote transmitter having one or more switches operated in a predetermined sequence, for example.

A method aspect according to the present invention is for increasing security in permitting remote control of a function associated with the vehicle using at least one uniquely coded remote transmitter, and a receiver within the vehicle for receiving a signal from the at least one uniquely coded remote transmitter. The method preferably comprises the steps of: storing in a memory a unique code of a remote transmitter to define a learned remote transmitter capable of causing performance of a function associated with the vehicle, and generating an indication relating to whether a new uniquely coded remote transmitter has been stored in the memory to thereby alert the user of a potentially unauthorized learned remote transmitter capable of remotely performing a function associated with the vehicle.

Still another aspect of the present invention relates to remote transmitter verification for providing increased security for a remote opening door, such as a garage door, for example. In particular, the remote control system for opening the door preferably comprises at least one uniquely coded remote transmitter, and a receiver associated with the door for receiving a signal from the at least one uniquely coded remote transmitter. A door controller is preferably provided for moving the door between open and closed positions. Remote transmitter learning means, operatively connected to the receiver, is preferably provided for learning a unique code of a remote transmitter to define a learned remote transmitter capable of causing the door controller to move the door to the open position. In addition, the system preferably includes remote transmitter verifying means for generating an indication relating to whether a new uniquely coded remote transmitter has been learned by the remote transmitter learning means.

BRIEF DESCRIPTION OF THE DRAWINGS

FIG. 5 is a schematic diagram of a remote vehicle engine starting system according to the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
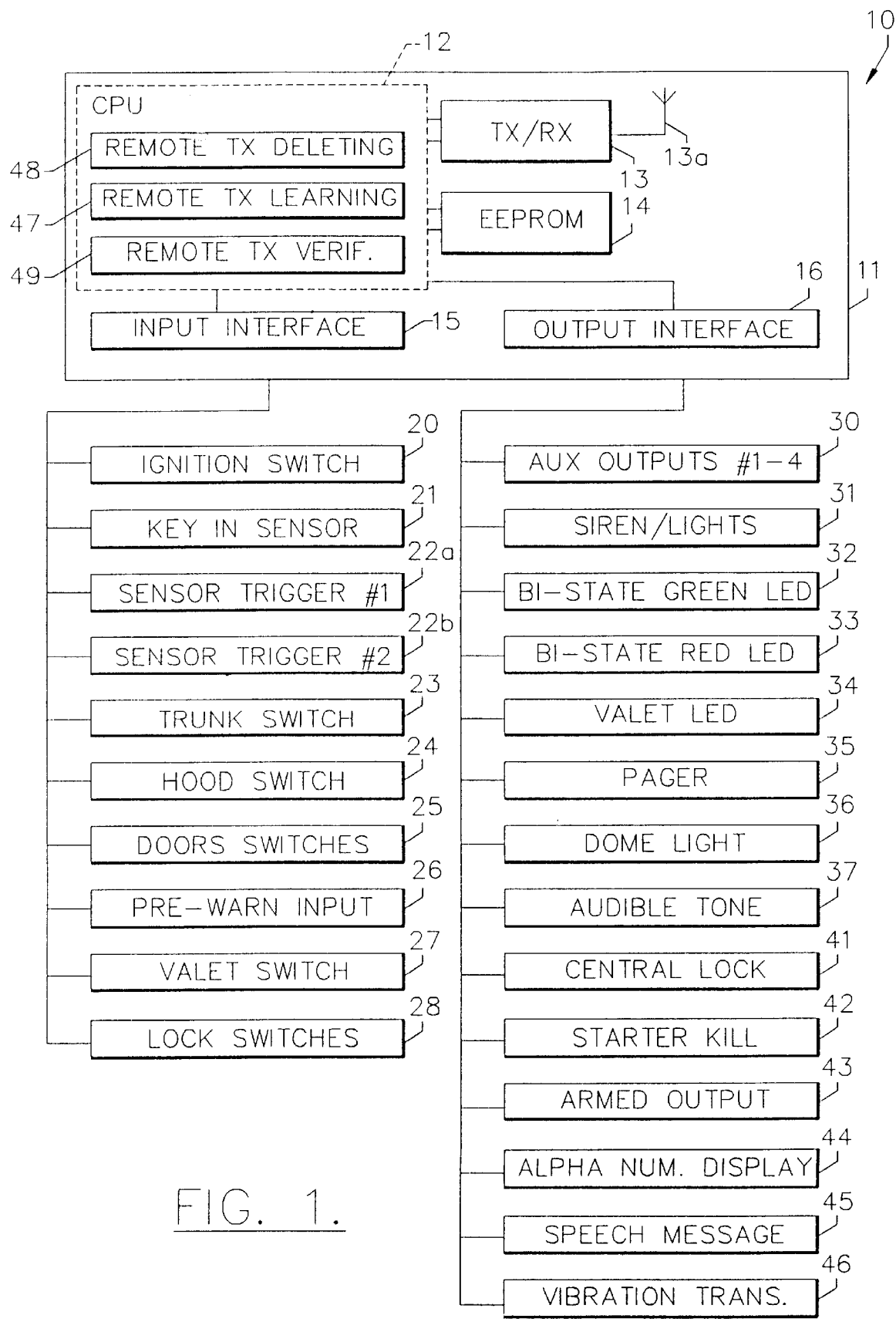
FIG. 1 is a schematic block diagram of the vehicle security system according to the invention.

Referring now to the schematic block diagram of FIG. 1, a vehicle security system 10 according to one aspect of the invention is first described. The security system includes a controller 11 which, in turn, in the illustrated embodiment, includes a central processing unit or microprocessor 12 operating under stored program control.

In the illustrated embodiment, a transmitter and receiver 13 are connected to the microprocessor 12 for receiving signals from a remote transmitter and for transmitting signals to a remote unit, as will be described in greater detail below. As would be readily understood by those skilled in the art, the transmitter portion of the controller 11 may not be needed in some embodiments of the invention. An antenna 13a is illustratively connected to the transmitter and receiver 13.

In the illustrated embodiment, the microprocessor is also operatively connected to a memory (EEPROM) 14 and an input interface 15 and an output interface 16. As would be readily understood by those skilled in the art, the microprocessor 12 may alternately or additionally have its own on-board memory.

The input interface 15 is illustratively connected to various vehicle input devices including: an ignition switch 20; a key in the ignition sensor 21; two zone sensors 22a, 22b; conventional trunk hood and door pin sensors or switches 23, 24, and 25, respectively; and door lock switches 28. In addition, a pre-warn sensor 26 and valet switch 27 also provide inputs to the controller 11 in the illustrated embodiment. As would be readily understood by those skilled in the art, other inputs are also contemplated by the present invention and are generally described herein by the term sensor. In addition, an input signal may also be received from a remote transmitter 50 (FIG. 2).

The output interface 16 of the controller 11 may preferably be connected to a plurality of output devices. As shown in FIG. 1, the outputs may include auxiliary relay outputs 30, such as for window control, remote starting, or a remote alarm indication, as would be readily understood by those skilled in the art. A siren and/or lights 31, and green and red light emitting diodes (LEDs) 32, 33 for dashboard mounting are also illustratively connected to the controller 11. Other outputs may be directed to a valet LED 34, a dome light 36, a central lock relay or lock control unit 41, a starter kill circuit 42, and an armed relay output 43. In addition, other outputs may be directed to one or more of an audible tone generator 37, an alphanumeric display 44, a speech message annunciator 45, and a vibration transducer 46, as will be readily appreciated by those skilled in the art. Other similar indicating devices are also contemplated by the present invention, as would be readily understood by those skilled in the art.

Figure 2:
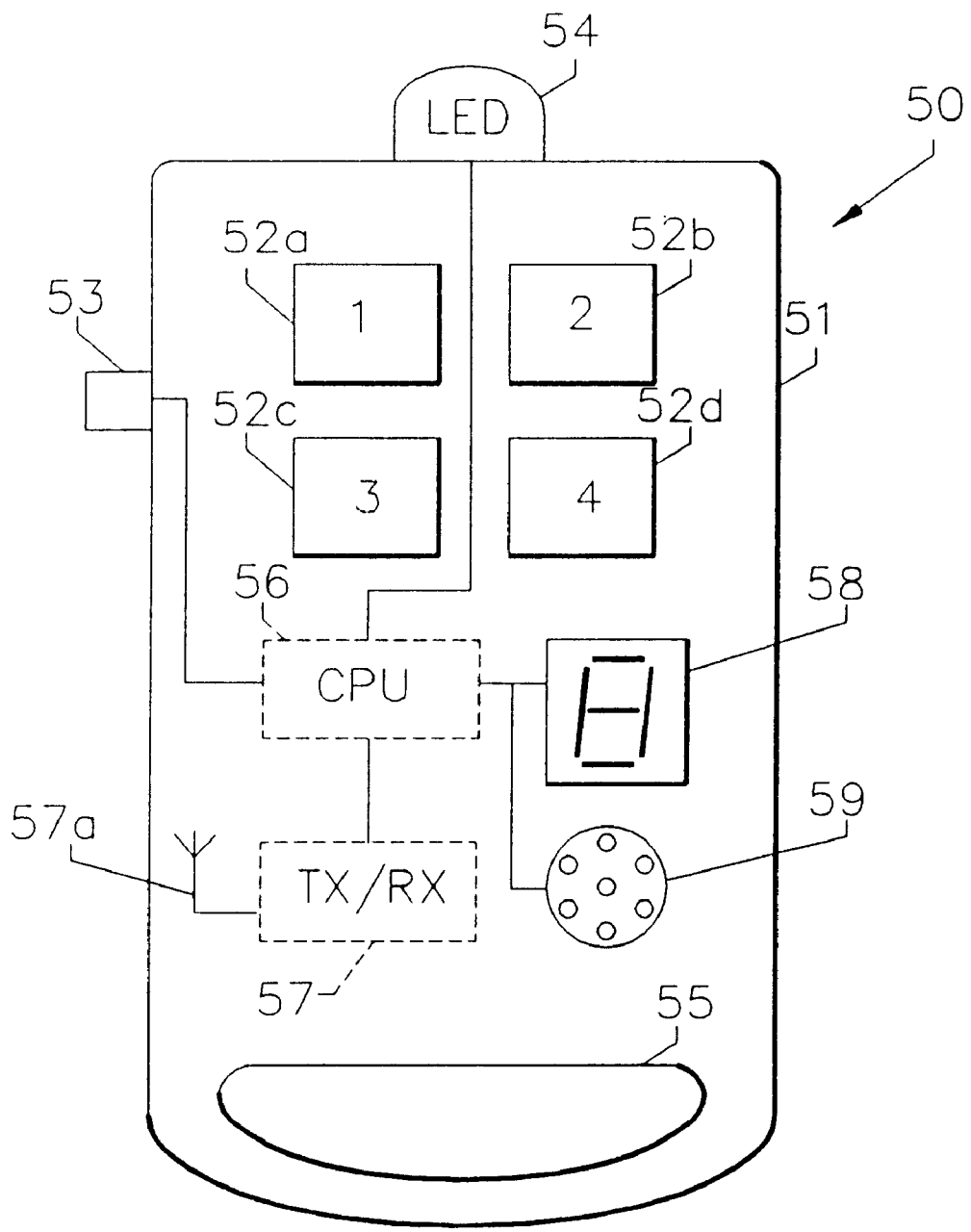
FIG. 2 is a schematic diagram of a remote transmitter for the vehicle security system according to the invention.

Referring now more particularly to FIG. 2, a remote transmitter 50 in accordance with the invention is described. The remote transmitter 50 includes a housing 51 and a plurality of first momentary contact switches 52a–52d carried by the housing. A second momentary contact switch 53 and an indicating light, such as the illustrated LED 54 are also carried by or mounted on the housing 51. As would be readily understood by those skilled in the art, the remote transmitter 50 is typically relatively small and includes an opening 55 for facilitating connection to a vehicle key ring, for example. In addition, the remote transmitter 50 includes a central processing unit or microprocessor 56 operatively connected to the plurality of first switches 52a–52d, the second switch 53, and the LED 54. The microprocessor is also connected to a transmitter and/or receiver circuit 57 and its associated antenna 57a for transmitting and/or receiving signals to and from the controller 11 of the vehicle security system 10. Accordingly, the term "remote transmitter" is used broadly herein to describe the embodiment also including receiver means.

The remote transmitter 50 may also include a numeric or alphanumeric display 58, and a speaker 59 coupled to an audible tone generator or a speech message generator, as may be provided by the microprocessor 56. A vibration transducer, not shown, may also be incorporated into the remote transmitter 50 for communicating to the user as would be readily understood by those skilled in the art.

The controller 11 preferably includes remote transmitter learning means 47 for permitting the addition or learning of a coded remote transmitter 50 to be capable of switching the controller between armed and disarmed modes, for example. In the armed mode the controller 11 is capable of generating an alarm via alarm indication means, such as the siren and/or flashing lights 31. The controller 11 generates the alarm responsive to at least one of the vehicle sensors, such as the trunk, hood and door switches 23, 24 and 25, or the other sensors 22a, 22b as would be readily understood by those skilled in the art. In the disarmed mode the controller 11 does not generate an alarm responsive to one or more of the vehicle sensors so that the user may enter the vehicle, for example.

The controller 11 preferably comprises remote transmitter verifying means 49 for generating an indication relating to whether a new uniquely coded remote transmitter has been learned by the remote transmitter learning means 47. In addition, the remote transmitter learning means 47 is preferably switchable between a learning or program mode permitting learning of a unique code of a remote transmitter 50, and a secure mode. As would be readily understood by those skilled in the art, the learning mode may be entered for a relatively short predetermined time and then automatically revert back to the secure mode to reduce the possibility of unauthorized remote transmitters being learned.

In one embodiment, the remote transmitter verifying means 49 comprises learning mode entered indicating means for indicating that the learning mode of the remote transmitter learning means has been entered. More particularly, the learning mode entered indicating means preferably comprises time lapse means for indicating when the learning mode of the remote transmitter learning means has last been entered. This indication can be provided by progressively indicating the elapsed time since the learning mode has last been entered.

According to another approach or embodiment of the invention, the remote transmitter verifying means 49 preferably comprises learned remote transmitter number indicating means for indicating a number of learned remote transmitters. In an embodiment where all remote transmitters are deleted when a new one is learned, the number of learned transmitters may change indicating that an unauthorized transmitter has been learned. Alternately, the remote transmitter verifying means 49 may comprise learned remote transmitter change indicating means for directly indicating a change in a number of learned remote transmitters. In yet another embodiment, the remote transmitter verifying means 49 preferably comprises learned remote transmitter code change indicating means for indicating a change in a unique code of the learned remote transmitters.

The remote transmitter verifying means 49 preferably includes remote transmitter indicating means for providing the indication. In other words, indicating means, such as a dashboard mounted light emitting diode 32, 33, may be flashed a number of times corresponding to the number of coded remote transmitters in one embodiment. Accordingly, the user is ensured that only the coded remote transmitters 50 under his control may operate the vehicle security system 10, and that no other remote transmitters have been surreptitiously coded to operate the controller.

Other embodiments of remote transmitter indicating means include, for example, the audible tone generator 37, numeric display 44, speech message generator 45 and vibration transducer 46 driven by the controller and associated with the vehicle. The dome light 36, headlights 31, and other LED's 32, 33 and 34 may also be used to give an indication to the user relating to the remote transmitters coded to operate the controller 11.

The remote transmitter indicating means may also be associated with or carried by a remote transmitter 50, or may be otherwise remote from the vehicle and be communicated to the remote site via a satellite or cellular telephone connection. For example, the indication means may be provided by a light 54, an alphanumeric display 58, a speech or tone generator 59, and a vibration transducer, for example, carried by the remote transmitter 50 (FIG. 2). Alternately, a remote monitoring station may be provided to monitor one or a plurality of vehicles in cooperation with the transmitter verifying means of each respective vehicle. In addition, a pager may be carried by the user to provide the indication.

The indication given to the user may preferably be the number of coded remote transmitters currently capable of switching the controller 11 to the disarmed mode from the armed mode. Alternately, the indication may be related to a change in the number of coded remote transmitters or a change in a code of a learned remote transmitter. The various indicating means and remote transmitter verifying means may also be used to simply alert the user that the learning mode has been recently entered. Accordingly, the remote transmitter verifying means 49 provides an indication relating to whether one or more remote transmitters has been added or learned without the owner's consent or knowledge. The indicating means may also further comprise repeater means for repeating an indication relating to the number of coded transmitters 50 for a predetermined time period or a predetermined number of repetitions.

Should the user determine that an unauthorized remote transmitter has been added or learned to operate the controller 11, the controller also preferably includes remote transmitter deleting means 48 for permitting deletion of the newly added unauthorized remote transmitter or all of the coded remote transmitters 50 capable of switching the controller between the armed and disarmed modes. In one embodiment, the deleting means preferably comprises means for deleting all of the previously learned remote transmitters. All of the previously learned remote transmitters may be deleted based upon entering the learning mode, that is, either when the learning mode is initially entered or when the first remote transmitter is learned, for example. If all of the coded remote transmitters are deleted by the deleting means 48, the authorized transmitters may thereafter be added by the remote transmitter learning means 47 as would be readily understood by those skilled in the art.

The vehicle security system 10 also preferably includes activating means for activating the remote transmitter indicating means responsive to a predetermined condition. For example, the indicating means may be triggered by the activating means responsive to operation of one of a signal from the remote transmitter 50; a manually operable switch, such as the valet switch 27; an ignition switch 20, including a key in the switch sensor 21; a door position switch 25; and a door lock switch 28. For example, the valet switch, ignition switch, remote transmitter buttons, or other manual switches could be operated in a predetermined sequence to activate the indicating means. Other similar means for activating the indicating means are also contemplated by the invention, and will be readily appreciated by those skilled in the art.

Figure 3:
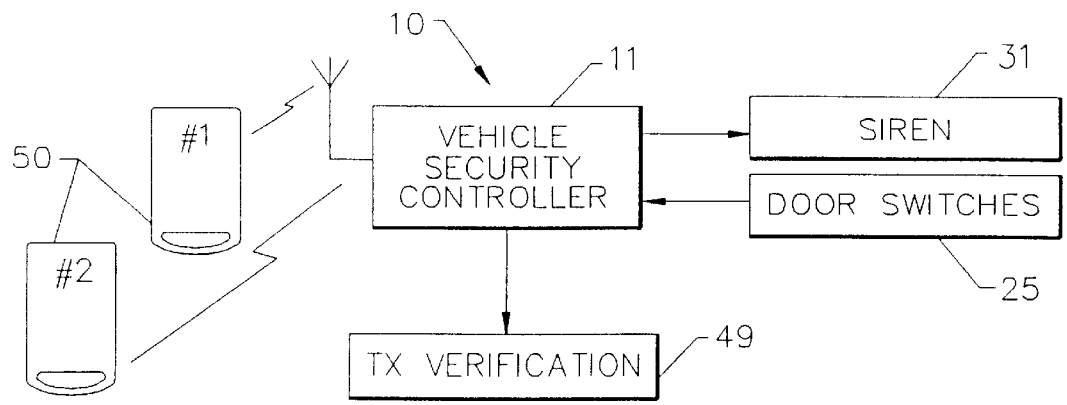
FIG. 3 is a schematic diagram of a remote control vehicle security system according to the present invention.

Referring now additionally to FIGS. 3–6, various embodiments of the transmitter verification feature of the present invention are further described. A vehicle security system 10 is schematically illustrated in FIG. 3 including the controller 11 along with the siren 31 and door switches 25. The transmitter verifying means 49 is illustrated in a separate block for clarity, although those of skill in the art will recognize that the logic features of the transmitter verifying means may be readily implemented via the microprocessor of the controller. Two illustrated remote transmitters 50 are capable of switching the controller 11 between armed and disarmed modes. When in the armed mode, tripping of the vehicle door switches 25 may typically activate the siren 31. In addition, the door switches 25 may also be used as part of the activation means to cause the transmitter verifying means to give an indication relating to an unauthorized remote transmitter.

Figure 4:
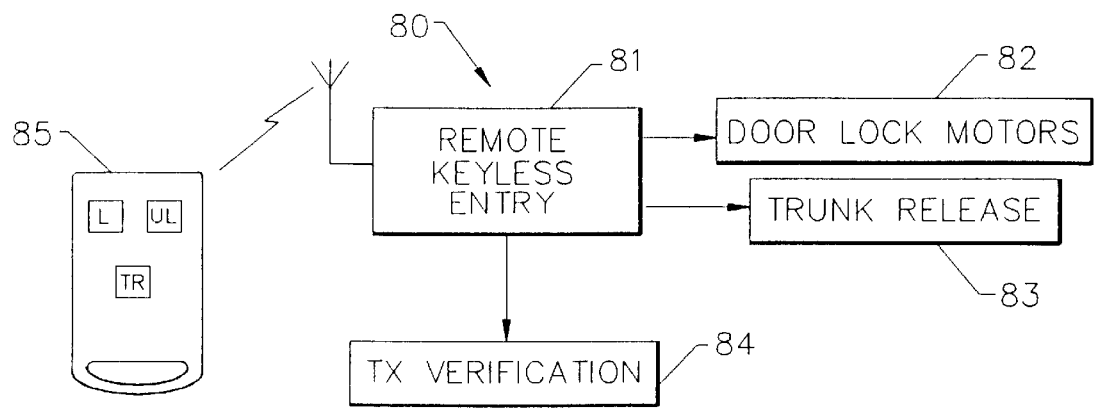
FIG. 4 is a schematic diagram of a remote control system for vehicle keyless entry according to the invention.

Referring now more particularly to FIG. 4, a remote keyless entry (RKE) system 80 is illustrated as another example of the remote transmitter verification aspect of the present invention applied to a vehicle remote control system. The RKE system 80 includes an RKE controller 81 which receives signals from one or more remote transmitters 85. The RKE controller 81 receives signals from the remote RKE transmitter 85 to either unlock the doors, via the illustrated power door lock motors 82, or open the trunk, via the trunk release 83 as would be readily understood by those skilled in the art. The illustrated RKE system 10 also includes remote transmitter verifying means 84 for generating an indication relating to an unauthorized transmitter being learned by the controller 81, as described above.

A remote engine start system 90 is schematically illustrated in FIG. 5. The remote start system 90 illustratively includes a remote start controller 91 operatively connected to the engine starter 92 and the ignition system 93 of the vehicle to permit the user to remotely start the engine, such as to warm or cool the vehicle interior prior to entering the vehicle. The remote start system 90 also includes remote transmitter verifying means 94 to reduce the likelihood that someone could learn an unauthorized remote transmitter 95 into the controller 91.

Figure 6:
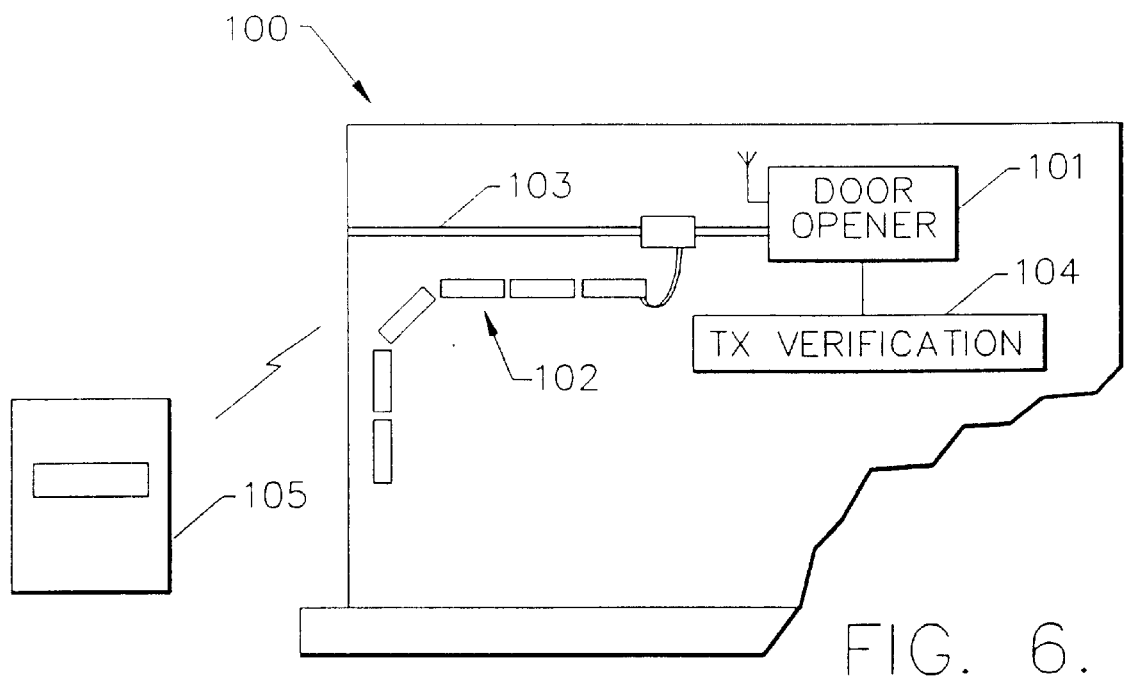
FIG. 6 is a schematic diagram of a remote control door opening system according to the invention.

Yet another illustrative embodiment of a remote control system according to the invention is understood with particular reference to FIG. 6. The illustrated door opening system 100 includes a conventional overhead door opener 101, such as for a garage. The door opener 101, in turn, includes a motor and receiver/controller as would be readily understood by those skilled in the art. The illustrated segmented garage door 102 is guided by a pair of opposing tracks, not shown. The illustrated garage door opener system 100 includes a remote transmitter 105 for operating the door remotely. In other words, entry into the garage, and possibly an adjoining structure, is achieved via the uniquely coded remote transmitters 105 learned into the controller. Accordingly, the door opener system 100 preferably also includes remote transmitter verifying means 104 as described herein. Many other possible security/access applications including remote transmitter verification features are contemplated by the present invention and will be readily appreciated by those skilled in the art. For example, remote control system directed to operation of a vehicle climate control system or vehicle sliding doors may also benefit from remote transmitter verification.

A method aspect in accordance with the present invention is for increasing security in permitting remote control of a function associated with a vehicle and using at least one uniquely coded remote transmitter 50, and a receiver 13 within the vehicle for receiving a signal from the uniquely coded remote transmitter. The method preferably comprises the steps of: storing in a memory 14 a unique code of a remote transmitter 50 to define a learned remote transmitter capable of causing performance of a function associated with the vehicle, and generating an indication relating to whether a new uniquely coded remote transmitter has been stored in the memory to thereby alert the user of a potentially unauthorized learned remote transmitter capable of remotely performing the function associated with the vehicle.

Figure 7:
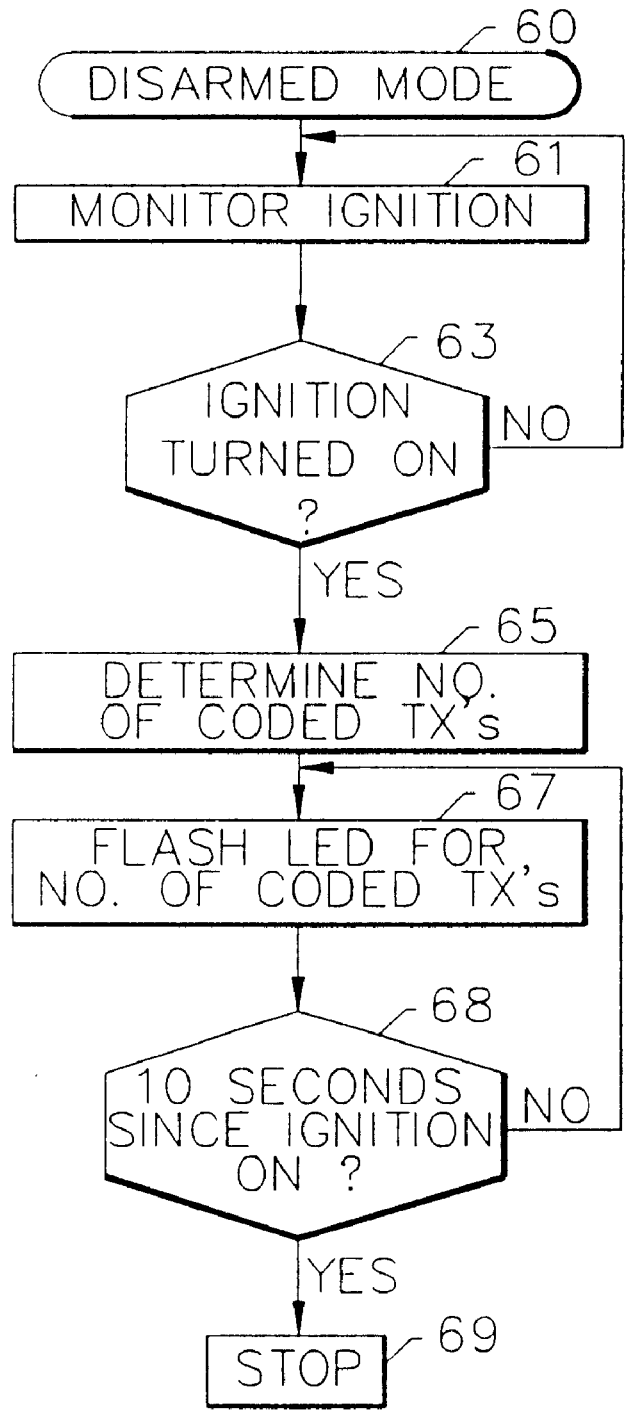
FIGS. 7 and 8 are flow charts illustrating examples of remote transmitter verification according to the invention.

A particular example of the transmitter verification feature of the present invention is explained with further reference to the flow chart of FIG. 7. In this example, the vehicle security system controller 11 (FIGS. 1 and 3) preferably includes ignition switch monitoring means 20 (FIG. 1) for determining whether a vehicle ignition switch is in an off position or an on position as monitored at Block 61 and when the controller is in the disarmed mode (Block 60). If the ignition is switched on (Block 63), the number of coded remote transmitters 50 (FIGS. 1–3) is determined or verified (Block 65). The controller 11 also preferably includes activating means for activating an LED 32, 33 (FIG. 1) to indicate the number of coded transmitters 50 at Block 67 responsive to turning the vehicle ignition to the on position and when the controller 11 is in the disarmed mode. The number of coded transmitters 50 may be repeated for a predetermined time, such as ten seconds, at Block 68. The verification feature is then stopped (Block 69). If unsure, the driver could turn the ignition off, and then back to the on position, to again verify the number of coded remote transmitters 50. Those of skill in the art will readily appreciate alternate embodiments incorporating other indicating means or activating means as described in greater detail herein.

Figure 8:
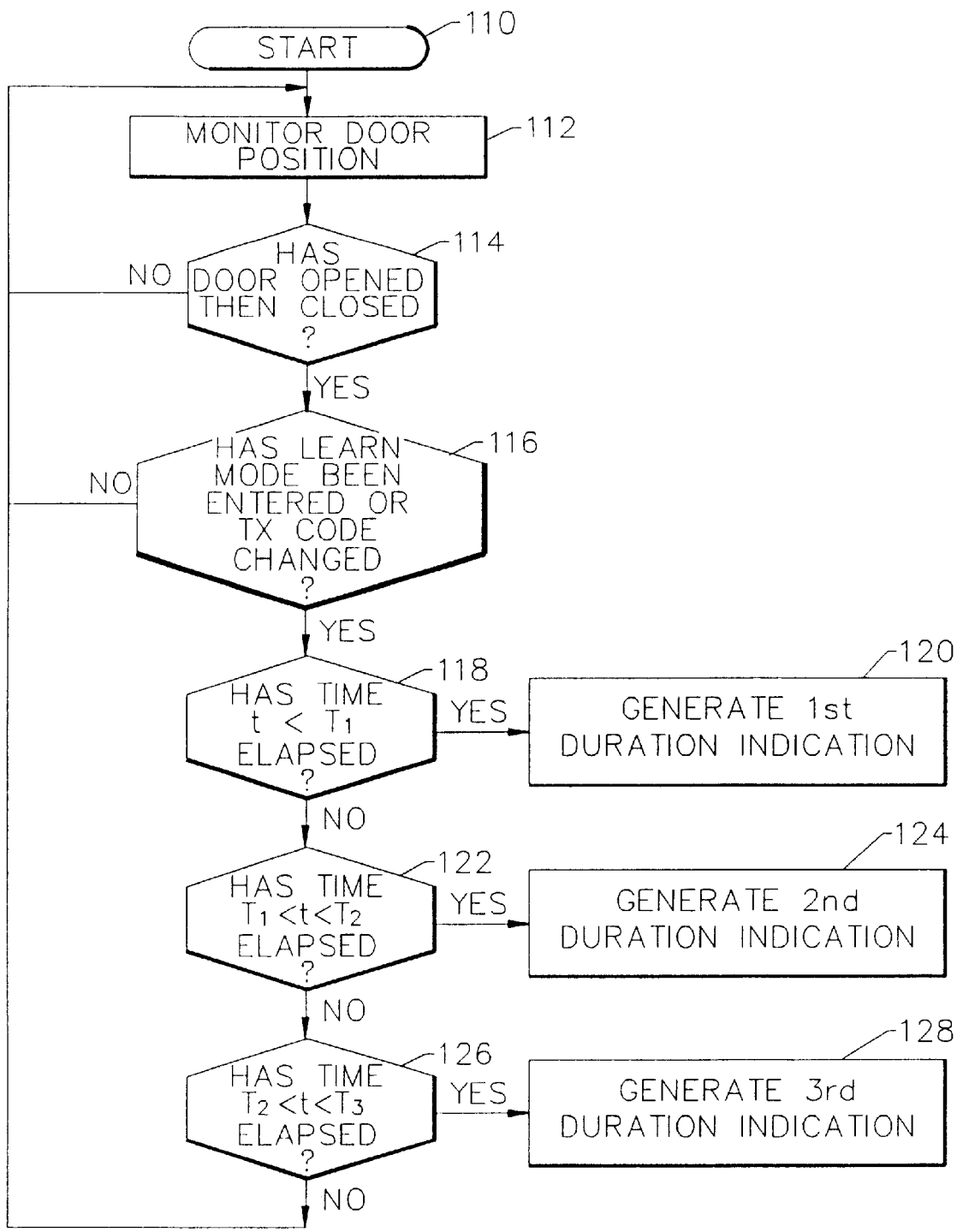

Referring to the flow chart of FIG. 8, another variation of the invention is described. In the illustrated flow chart, operation of an RKE system 90 (FIG. 5) is explained, although those of skill in the art will recognize its applicability to the vehicle security system 10 and other remote control applications contemplated by the present invention. From the start (Block 110), the door position is monitored at Block 112. If a door, such as the driver's door, has been determined at Block 114 to have been opened and closed, it is next determined whether the remote transmitter learn mode has been entered or a remote transmitter code changed at Block 116. If the door has not been opened and closed, or the learn mode or transmitter code not changed, the system returns to monitoring the door position at Block 112.

If the learn mode has been entered or the code changed, the elapsed time t since that event is compared against a threshold T1 at Block 118. If the elapsed time t is less than T1, then a first duration signal may be generated at Block 120. If the elapsed time t is between T1 and a second threshold T2 as determined at Block 122, then a second duration indication can be generated (Block 124). Similarly, if the elapsed time t is between T2 and a third threshold T3 as determined at Block 126, then a third duration indication may be given at Block 128. The sequence can be extended or shortened as would be readily appreciated by those skilled in the art.

For example, if the learn mode has been entered within the prior forty-eight hours, an indicating light may be illuminated for a thirty second duration responsive to the activation means. The duration could thereafter be decremented five seconds for each 48 hours of elapsed time, so that the indication would eventually automatically terminate with the passage of sufficient time. As another example, the light could be illuminated for ninety seconds the first day, and decrement ten seconds each day thereafter. It is desirable that the indication inform the user of how recently the learn mode or transmitter change has been made so that the user may correlate the change with someone's ability to access the RKE system 90, and/or to compare the timing with an authorized servicing or repair of the RKE system. An appropriate voice message could also be generated alerting the user to when the learning mode was last entered, for example.

Further information relating to the vehicle security system and aspects thereof may be found in parent application entitled "Vehicle Security System Having Enhanced Remote Transmitter Security" Ser. No. 08/423,570, filed Apr. 14, 1995, assigned to the assignee of the present invention and incorporated herein by reference in its entirety. In addition, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle security system comprising:
   at least one vehicle security sensor;
   an alarm controller switchable between an armed mode for generating an alarm responsive to the at least one vehicle security sensor, and a disarmed mode;
   at least one uniquely coded remote transmitter;
   a receiver for receiving a signal from said at least one uniquely coded remote transmitter;
   remote transmitter learning means, operatively connected to said receiver, for learning a unique code of a remote transmitter to define a learned remote transmitter for remotely switching the alarm controller; and
   remote transmitter verifying means for generating an indication relating to whether a new uniquely coded remote transmitter has been learned by the remote transmitter learning means to thereby alert the user of a potentially unauthorized learned remote transmitter for switching the alarm controller.

2. A vehicle security system according to claim 1 wherein said remote transmitter learning means is switchable between a learning mode permitting learning of a unique code of a remote transmitter, and a secure mode.

3. A vehicle security system according to claim 2 wherein said remote transmitter learning means comprises remote transmitter deleting means for deleting all prior learned remote transmitters based upon entering the learning mode.

4. A vehicle security system according to claim 2 wherein said remote transmitter verifying means comprises learning mode entered indicating means for indicating that the learning mode of said remote transmitter learning means has been entered.

5. A vehicle security system according to claim 4 wherein said learning mode entered indicating means comprises time lapse means for indicating when the learning mode of said remote transmitter learning means has last been entered.

6. A vehicle security system according to claim 5 wherein said time lapse means comprises means for progressively indicating a passage of time since the learning mode has last been entered.

7. A vehicle security system according to claim 1 wherein said remote transmitter verifying means comprises learned remote transmitter number indicating means for indicating a number of learned remote transmitters.

8. A vehicle security system according to claim 1 wherein said remote transmitter verifying means comprises learned remote transmitter change indicating means for indicating a change in a number of learned remote transmitters.

9. A vehicle security system according to claim 1 wherein said remote transmitter verifying means comprises learned remote transmitter code change indicating means for indicating a change in a unique code of learned remote transmitters.

10. A vehicle security system according to claim 1 wherein said remote transmitter verifying means comprises indicating means for generating an indication relating to whether a new uniquely coded remote transmitter has been learned by the remote transmitter learning means.

11. A vehicle security system according to claim 10 wherein said indicating means comprises vehicle indicating means associated with the vehicle; and wherein said vehicle indicating means comprises at least one of a light, a visual display, a vibration transducer, a speech message generator, and an audible signal generator.

12. A vehicle security system according to claim 10 wherein said indicating means comprises remote indicating means remotely positioned from the vehicle; and wherein said remote indicating means comprises at least one of a light, a visual display, a vibration transducer, a speech message generator, and an audible signal generator.

13. A vehicle security system according to claim 10 wherein said verifying means further comprises activating means for causing said indicating means to generate an indication.

14. A vehicle security system according to claim 13 wherein said activating means comprises a valet switch operatively connected to said alarm controller.

15. A vehicle security system according to claim 13 wherein said activating means comprises an ignition switch.

16. A vehicle security system according to claim 13 wherein said activating means comprises vehicle activating means associated with the vehicle; and wherein said vehicle activating means comprises at least one of a manually operated switch, a vehicle switch, and a vehicle sensor.

17. A vehicle security system according to claim 13 wherein said activating means comprises remote activating means remote from the vehicle; and wherein said remote activating means comprises a remote transmitter.

18. A remote control system for a vehicle for permitting a user to remotely control a function associated with the vehicle and comprising:
   at least one uniquely coded remote transmitter;
   a receiver within the vehicle for receiving a signal from said at least one uniquely coded remote transmitter;
   remote transmitter learning means, operatively connected to said receiver, for learning a unique code of a remote transmitter to define a learned remote transmitter for causing performance of a function associated with the vehicle; and
   remote transmitter verifying means for generating an indication relating to whether a new uniquely coded remote transmitter has been learned by the remote transmitter learning means by indicating a change in a unique code of learned remote transmitters.

19. A remote control system for a vehicle according to claim 18 wherein said remote transmitter learning means is switchable between a learning mode permitting learning of a unique code of a remote transmitter, and a secure mode.

20. A remote control system for a vehicle according to claim 19 wherein said remote transmitter learning means comprises remote transmitter deleting means for deleting all prior learned remote transmitters based upon entering the learning mode.

21. A remote control system for a vehicle according to claim 19 wherein said remote transmitter verifying means comprises learning mode entered indicating means for indicating that the learning mode of said remote transmitter learning means has been entered.

22. A remote control system for a vehicle according to claim 21 wherein said learning mode entered indicating means comprises time lapse means for indicating when the learning mode of said remote transmitter learning means has last been entered.

23. A remote control system for a vehicle according to claim 22 wherein said time lapse means comprises means for progressively indicating a passage of time since the learning mode has last been entered.

24. A remote control system for a vehicle according to claim 18 wherein said remote transmitter verifying means comprises indicating means for generating an indication relating to whether a new uniquely coded remote transmitter has been learned by the remote transmitter learning means.

25. A remote control system for a vehicle according to claim 24 wherein said indicating means comprises vehicle indicating means associated with the vehicle; and wherein said vehicle indicating means comprises at least one of a light, a visual display, a vibration transducer, a speech message generator, and an audible signal generator.

26. A remote control system for a vehicle according to claim 24 wherein said indicating means comprises remote indicating means remotely positioned from the vehicle; and wherein said remote indicating means comprises at least one of a light, a visual display, a vibration transducer, a speech message generator, and an audible signal generator.

27. A remote control system for a vehicle according to claim 24 wherein said verifying means further comprises activating means for causing said indicating means to generate an indication.

28. A remote control system for a vehicle according to claim 27 wherein said activating means comprises vehicle activating means associated with the vehicle; and wherein said vehicle activating means comprises at least one of a manually operated switch, a vehicle switch, and a vehicle sensor.

29. A remote control system for a vehicle according to claim 27 wherein said activating means comprises remote activating means remote from the vehicle; and wherein said remote activating means comprises a remote transmitter.

30. A remote control system for a vehicle according to claim 18 further comprising:
   at least one vehicle security sensor; and
   an alarm controller switchable between an armed mode and a disarmed mode responsive to a learned remote transmitter, said alarm controller in the disarmed mode being for generating an alarm responsive to the at least one vehicle security sensor.

31. A remote control system for a vehicle according to claim 18 further comprising:
   a plurality of vehicle door locks movable between locked and unlocked positions; and
   a door lock controller for moving the vehicle door locks between locked and unlocked positions responsive to a learned remote transmitter.

32. A remote control system for a vehicle according to claim 18 further comprising:
   a vehicle engine starter; and
   a remote start controller for operating the vehicle engine starter responsive to a learned remote transmitter.

33. A remote control system for a vehicle for permitting a user to remotely control a function associated with the vehicle and comprising:

at least one uniquely coded remote transmitter;

a receiver within the vehicle for receiving a signal from said at least one uniquely coded remote transmitter;

remote transmitter learning means, operatively connected to said receiver, for learning a unique code of a remote transmitter to define a learned remote transmitter for causing performance of a function associated with the vehicle, said remote transmitter learning means being switchable between a learning mode permitting learning of a unique code of a remote transmitter and a secure mode; and remote transmitter verifying means for generating an indication relating to whether a new uniquely coded remote transmitter has been learned by the remote transmitter learning means, said remote transmitter verifying means comprising time lapse means for indicating when the learning mode of said remote transmitter learning means has last been entered.

34. A remote control system for a vehicle according to claim 33 wherein said time lapse means comprises means for progressively indicating a passage of time since the learning mode has last been entered.

35. A remote control system for a vehicle according to claim 33 wherein said remote transmitter learning means comprises remote transmitter deleting means for deleting all prior learned remote transmitters based upon entering the learning mode.

36. A remote control system for a vehicle according to claim 33 wherein said remote transmitter verifying means comprises indicating means for generating an indication relating to whether a new uniquely coded remote transmitter has been learned by the remote transmitter learning means.

37. A remote control system for a vehicle according to claim 36 wherein said indicating means comprises vehicle indicating means associated with the vehicle; and wherein said vehicle indicating means comprises at least one of a light, a visual display, a vibration transducer, a speech message generator, and an audible signal generator.

38. A remote control system for a vehicle according to claim 36 wherein said indicating means comprises remote indicating means remotely positioned from the vehicle; and wherein said remote indicating means comprises at least one of a light, a visual display, a vibration transducer, a speech message generator, and an audible signal generator.

39. A remote control system for a vehicle according to claim 36 wherein said verifying means further comprises activating means for causing said indicating means to generate an indication.

40. A remote control system for a vehicle according to claim 39 wherein said activating means comprises vehicle activating means associated with the vehicle; and wherein said vehicle activating means comprises at least one of a manually operated switch, a vehicle switch, and a vehicle sensor.

41. A remote control system for a vehicle according to claim 39 wherein said activating means comprises remote activating means remote from the vehicle; and wherein said remote activating means comprises a remote transmitter.

42. A remote control system for a vehicle according to claim 33 further comprising:

at least one vehicle security sensor; and an alarm controller switchable between an armed mode and a disarmed mode responsive to a learned remote transmitter, said alarm controller in the disarmed mode for generating an alarm responsive to the at least one vehicle security sensor.

43. A remote control system for a vehicle according to claim 33 further comprising:

a plurality of vehicle door locks movable between locked and unlocked positions; and a door lock controller for moving the vehicle door locks between locked and unlocked positions responsive to a learned remote transmitter.

44. A remote control system for a vehicle according to claim 33 further comprising:

a vehicle engine starter; and a remote start controller for operating the vehicle engine starter responsive to a learned remote transmitter.

45. A method for increasing security in permitting remote control a function associated with the vehicle using at least one uniquely coded remote transmitter, and a receiver within the vehicle for receiving a signal from the at least one uniquely coded remote transmitter, said method comprising the steps of:

storing in a memory a unique code of a remote transmitter to define a learned remote transmitter for causing performance of a function associated with the vehicle; and generating an indication relating to whether a new uniquely coded remote transmitter has been stored in the memory to thereby alert the user of a potentially unauthorized learned remote transmitter capable of remotely performing a function associated with the vehicle.

46. A method according to claim 45 wherein said memory is switchable between a learning mode permitting learning of a unique code of a remote transmitter, and a secure mode; and further comprising the step of deleting all prior learned remote transmitters based upon entering the learning mode.

47. A method according to claim 45 wherein the step of generating an indication comprises indicating that the learning mode of the memory has been entered.

48. A method according to claim 47 wherein the step of indicating comprises indicating when the learning mode of the memory has last been entered.

49. A method according to claim 48 wherein the step of indicating comprises progressively indicating a passage of time since the learning mode has last been entered.

50. A method according to claim 45 wherein the step of generating an indication comprises indicating a number of learned remote transmitters.

51. A method according to claim 45 wherein the step of generating an indication comprises indicating a change in a number of learned remote transmitters.

52. A method according to claim 45 wherein the step of generating an indication comprises indicating a change in a unique code of learned remote transmitters.

53. A method according to claim 45 wherein the step of generating an indication comprises operating at the vehicle at least one of a light, a visual display, a vibration transducer, a speech message generator, and an audible signal generator.

54. A method according to claim 45 wherein the step of generating an indication comprises operating remote from the vehicle at least one of a light, a visual display, a vibration transducer, a speech message generator, and an audible signal generator.

55. A method according to claim 45 further comprising the step of causing generating of the indication responsive to at least one of a manually operated switch, a vehicle switch, and a vehicle sensor.

56. A method according to claim 45 further comprising the step of causing generating of the indication responsive to a remote transmitter.

57. A method according to claim 45 further comprising the step of performing a function associated with the vehicle responsive to a learned remote transmitter; and wherein the function comprises switching an alarm controller between an armed mode and a disarmed mode.

58. A method according to claim 45 further comprising the step of performing a function associated with the vehicle responsive to a learned remote transmitter; and wherein the function comprises moving vehicle door locks between locked and unlocked positions.

59. A method according to claim 45 further comprising the step of performing a function associated with the vehicle responsive to a learned remote transmitter; and wherein the function comprises starting an engine of the vehicle.

60. A remote control system for opening a door and comprising:
   at least one uniquely coded remote transmitter;
   a receiver associated with the door for receiving a sign from said at least one uniquely coded remote transmitter;
   a door controller for moving the door between open and closed positions;
   remote transmitter learning means, operatively connected to said receiver, for learning a unique code of a remote transmitter to define a learned remote transmitter for causing said door controller to move the door to the open position; and
   remote transmitter verifying means for generating an indication relating to whether a new uniquely coded remote transmitter has been learned by the remote transmitter learning means by indicating a number of learned remote transmitters.

61. A remote control system for opening a door according to claim 60 wherein said remote transmitter verifying means comprises learning mode entered indicating means for indicating that the learning mode of said remote transmitter learning means has been entered.

62. A remote control system for opening a door and comprising:
   at least one uniquely coded remote transmitter;
   a receiver associated with the door for receiving a signal from said at least one uniquely coded remote transmitter;
   a door controller for moving the door between open and closed positions;
   remote transmitter learning means, operatively connected to said receiver, for learning a unique code of a remote transmitter to define a learned remote transmitter for causing said door controller to move the door to the open position; and
   remote transmitter verifying means for generating an indication relating to whether a new uniquely coded remote transmitter has been learned by the remote transmitter learning means by indicating a change in a number of learned remote transmitters.

* * * * *

UNITED STATES PATENT AND TRADEMARK OFFICE
CERTIFICATE OF CORRECTION

PATENT NO. : 6,140,938
DATED : October 31, 2000
INVENTOR(S) : Kenneth E. Flick

It is certified that error appears in the above-identified patent and that said Letters Patent is hereby corrected as shown below:

Drawings,
Figure 5, insert -- Figure 5 --

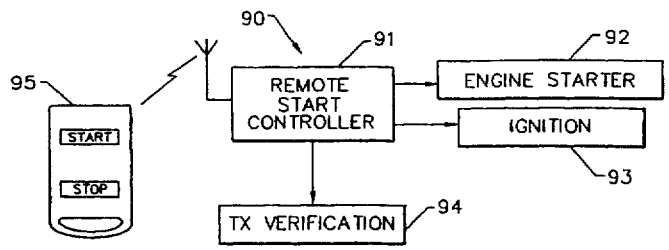

FIG. 5.

Claim 30,
Line 54, delete "being"

Claim 60,
Line 22, delete "sign", insert -- signal --

Signed and Sealed this

Sixth Day of November, 2001

*Attest:*

NICHOLAS P. GODICI
*Attesting Officer*    Acting Director of the United States Patent and Trademark Office